United States Patent
Medling

(10) Patent No.: US 7,411,132 B1
(45) Date of Patent: Aug. 12, 2008

(54) WATER BLOCKING ELECTRICAL CABLE

(75) Inventor: Christopher T. Medling, Scotland, CT (US)

(73) Assignee: General Cable Technologies Corporation, Highland, KY (US)

( * ) Notice: Subject to any disclaimer, the term of this patent is extended or adjusted under 35 U.S.C. 154(b) by 0 days.

(21) Appl. No.: 11/727,369

(22) Filed: Mar. 26, 2007

Related U.S. Application Data

(60) Provisional application No. 60/856,378, filed on Nov. 3, 2006.

(51) Int. Cl.
*H01B 11/02* (2006.01)

(52) U.S. Cl. .................................. 174/113 R; 174/116

(58) Field of Classification Search .............. 174/113 R, 174/116
See application file for complete search history.

(56) References Cited

U.S. PATENT DOCUMENTS

| | | | |
|---|---|---|---|
| 2,180,731 A * | 11/1939 | Dickinson ............... | 174/105 B |
| 3,999,003 A | 12/1976 | Chevrolet et al. | |
| 4,326,094 A | 4/1982 | Hunn et al. | |
| 4,675,474 A * | 6/1987 | Neuroth .................. | 174/102 R |
| 4,820,560 A | 4/1989 | Buchwald et al. | |
| 4,870,226 A | 9/1989 | Kreuger et al. | |
| 4,963,695 A | 10/1990 | Marciano-Agostinelli et al. | |
| 5,010,209 A | 4/1991 | Marciano-Agostinelli et al. | |
| 5,095,175 A * | 3/1992 | Yoshida et al. ............ | 174/23 R |
| 5,095,176 A | 3/1992 | Harbrecht et al. | |
| 5,146,046 A | 9/1992 | Arroyo et al. | |
| 5,373,100 A | 12/1994 | Arroyo et al. | |
| 5,486,648 A | 1/1996 | Chan et al. | |
| 5,630,003 A * | 5/1997 | Arroyo ....................... | 385/113 |
| 5,817,974 A | 10/1998 | Bovenschen et al. | |
| 5,949,018 A | 9/1999 | Esker | |
| 6,195,487 B1 * | 2/2001 | Anderson et al. ........... | 385/101 |
| 6,215,070 B1 | 4/2001 | King et al. | |
| 6,242,692 B1 | 6/2001 | King et al. | |
| 6,246,006 B1 | 6/2001 | Hardin et al. | |
| 6,500,541 B1 | 12/2002 | Schoeck, Jr. et al. | |
| 6,528,730 B2 * | 3/2003 | Persson ..................... | 174/116 |
| 6,633,709 B2 | 10/2003 | VanVickle et al. | |
| 6,681,071 B2 | 1/2004 | Newton et al. | |
| 6,914,193 B2 | 7/2005 | Ware et al. | |
| 6,922,512 B2 | 7/2005 | Nechitailo | |
| 7,087,842 B2 | 8/2006 | Belli et al. | |
| 2003/0098170 A1 | 5/2003 | Easter | |
| 2003/0178222 A1 | 9/2003 | Moore et al. | |

(Continued)

FOREIGN PATENT DOCUMENTS

DE          1056684         5/1959

(Continued)

*Primary Examiner*—Chau N Nguyen
(74) *Attorney, Agent, or Firm*—Michael C. Greenbaum; Blank Rome LLP

(57) ABSTRACT

An electrical cable for shipboard use that can block water is disclosed. The electrical cable includes conductors, water swellable tapes, water swellable yarns, solid fillers, and a jacket. Each conductor is substantially wrapped with water swellable tape. The conductors are disposed adjacent to each other thereby forming interstitial voids between each of the conductors. Solid fillers and water swellable yarns are alternatively disposed in each interstitial void. Additional water swellable tape substantially envelopes the conductors, water swellable yarns, and solid fillers. The jacket is disposed on the outermost peripheral surface of the electrical cable.

48 Claims, 2 Drawing Sheets

U.S. PATENT DOCUMENTS

| | | |
|---|---|---|
| 2004/0065457 A1 | 4/2004 | Hager et al. |
| 2005/0016755 A1 | 1/2005 | Martinez et al. |
| 2005/0213902 A1 | 9/2005 | Parsons |
| 2006/0137897 A1 | 6/2006 | Grogl et al. |

FOREIGN PATENT DOCUMENTS

| | | |
|---|---|---|
| DE | 2007163 | 9/1971 |
| DE | 3115990 | 11/1982 |
| DE | 3330957 | 3/1985 |
| EP | 024631 | 3/1981 |
| EP | 1132761 | 9/2001 |
| EP | 1431790 | 6/2004 |
| EP | 1577901 | 9/2005 |
| EP | 1634304 | 3/2006 |
| GB | 1200434 | 7/1970 |
| JP | 5-314825 | 11/1993 |
| WO | WO-2006048040 | 5/2006 |

\* cited by examiner

WATER BLOCKING ELECTRICAL CABLE

RELATED APPLICATION

This application claims priority to provisional application Ser. No. 60/856,378, filed Nov. 3, 2006, the disclosure of which is incorporated herein by reference in its entirety.

FIELD OF THE INVENTION

The present invention relates to an electrical cable. In particular, the present invention relates to an electrical cable containing water blocking material.

BACKGROUND OF THE INVENTION

To effectively convey electrical power from one location to another, an electrical cable must minimize or prevent any degradation in its conductivity caused by moisture. High moisture levels inside the electrical cable can have a detrimental effect on the conductive characteristics of the cable. Depending on the construction of the particular electrical cable, the introduction of moisture can result in a short circuit, an increase in the electrical cable's capacitance, or in the complete failure of the electrical cable.

Moisture can penetrate to the interior of the electrical cable by several different ways. Water may enter through a failure in an electrical cable's jacket. Water may also enter through a failure where two electrical cables are joined. Mechanical impacts, electrical arcs, or lightning may breach the jacket that protects the electrical cable or the joint where the electrical cable joins another. Water may then flow towards the core of the electrical cable and longitudinally along the length of the electrical cable. Changes in ambient conditions may lead to differences in water vapor pressure between the interior and the exterior of the electrical cable. The difference in vapor pressure then causes moisture to diffuse into the interior of the electrical cable. Eventually, there may be an undesirable level of moisture inside the cable. Since the electrical cable's ability to resist penetration by moisture may be a crucial characteristic in certain applications, the electrical cable must be tested and meet specific standards to minimize the possibility of conductive degradation caused by the presence of water within the electrical cable.

Different standards with respect to water blocking apply to electrical cables depending on the particular application and use. One such standard is MIL-DTL-24643, which is set by the Naval Sea Systems Command, and it specifies the water blocking requirements for an electrical cable to be used on a Navy ship. To meet the requirements of MIL-DTL-24643, an open end of the electrical cable is subjected to a predetermined water pressure for a predetermined amount of time. Electrical cables that allow a specified minimum amount of water migration to a specified length when subjected to the test are deemed "water blocked."

Various methods have been used to block water. A pulp or paper insulated electrical cable tends to swell and prevent further penetration of moisture. But, once water enters the interior of the electrical cable with a pulp or paper insulation, it can cause short circuits between conductors. In a cable insulated by plastic or a polymeric material, water can travel by capillary action along the cable interstices, causing problems in conductivity. In most environments, it is desirable, if not essential, that the cable is more watertight than can be achieved with polymeric material alone. Some electrical cables may include a metal/plastic laminate foil beneath the outer protective jacket of the electrical cable. The metal/plastic laminate foil may become bonded to the polymeric material, normally when the polymer is extruded. However, it is difficult to design a jacket in which the laminate foil remains intact when the electrical cable is subjected to impact, as the laminate tends to be driven into gaps between conductors lying underneath the laminate and to split along resulting crease lines.

Another method of protecting a cable against water penetration by capillary action along cable interstices is to use a filler material. Filler materials are commonly synthetic polymers, petroleum based greases, oils, or silicone flooding compounds. Filler materials may be coated on components of the electrical cable to prevent longitudinal movement of moisture. Also, interstices within the cables may be filled with the filler material to minimize water entry and migration. However, filler materials such as silicone flooding compound do not consistently block water. Also, applying filler material in order to block water necessitates additional handling and processing measures in the manufacturing of the cable. The additional measures increase manufacturing time. Further, the addition of filler material significantly increases the weight of the electrical cable. Finally, electrical cables with filler material cannot be terminated without peeling away or removing waterblocking material on the insulated conductors.

SUMMARY OF THE INVENTION

Accordingly, it is an aspect of the invention to provide an electrical cable that is capable of blocking water, lighter in weight, simpler to manufacture, and easier to terminate.

An exemplary embodiment of the present invention provides an electrical cable. The electrical cable includes conductors, water swellable tapes, water swellable yarns, solid fillers, and a jacket. Each conductor is substantially wrapped with water swellable tape. The conductors are disposed adjacent to each other, thereby forming interstitial voids between each of the conductors. Solid fillers and water swellable yarns are alternatively disposed in each interstitial void. Additional water swellable tape substantially envelopes the conductors, water swellable yarns, and solid fillers. The jacket is disposed on the outermost peripheral surface of the electrical cable.

Another embodiment of the present invention provides an electrical cable. The electrical cable includes conductors, water swellable tapes, water swellable yarns, solid fillers, and a jacket. Each conductor is substantially wrapped with water swellable tape. The conductors are disposed adjacent to each other, thereby forming interstitial voids between each of the conductors. Solid fillers and water swellable yarns are alternatively disposed in each interstitial void. The jacket is disposed on the outermost peripheral surface of the electrical cable.

Yet another embodiment of the present invention provides an electrical cable that includes conductors, water swellable tape, water swellable yarns, solid fillers, and a jacket. A center conductor composed of conductive strands is substantially wrapped by water swellable tape. A first group of conductors, each of which are substantially wrapped by water swellable tape and composed of conductive strands, are disposed adjacent to the center conductor. A first set of interstitial voids is formed between the center conductor and the first group of conductors. Water swellable yarns are placed in each of the first set of interstitial voids. A second set of interstitial voids is formed between conductors in the first group and are situated radially outward from the first set of interstitial voids. Solid fillers are placed in each of the second set of interstitial voids. Water swellable tape then substantially wraps an outermost surface formed by the first group of conductors and solid fillers. Then, a second group of conductors are placed next to the water swellable tape. Each of the conductors in the second group are substantially wrapped in water swellable tape and composed of conductive strands. A third set of interstitial voids are formed between the conductors of the second group. Water swellable yarns are placed in the third set of interstitial voids. A fourth set of interstitial voids are formed between conductors of the second group radially outward from the third set of interstitial voids. Solid fillers are placed in the fourth set of interstitial voids. Water swellable tape then substantially surrounds an outermost area formed by the second group of conductors and solid fillers. A jacket is then placed on an outermost peripheral area of the electrical cable.

Other objects, advantages and salient features of the invention will become apparent from the following detailed description, which, taken in conjunction with the annexed drawings, discloses a preferred embodiment of the present invention.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
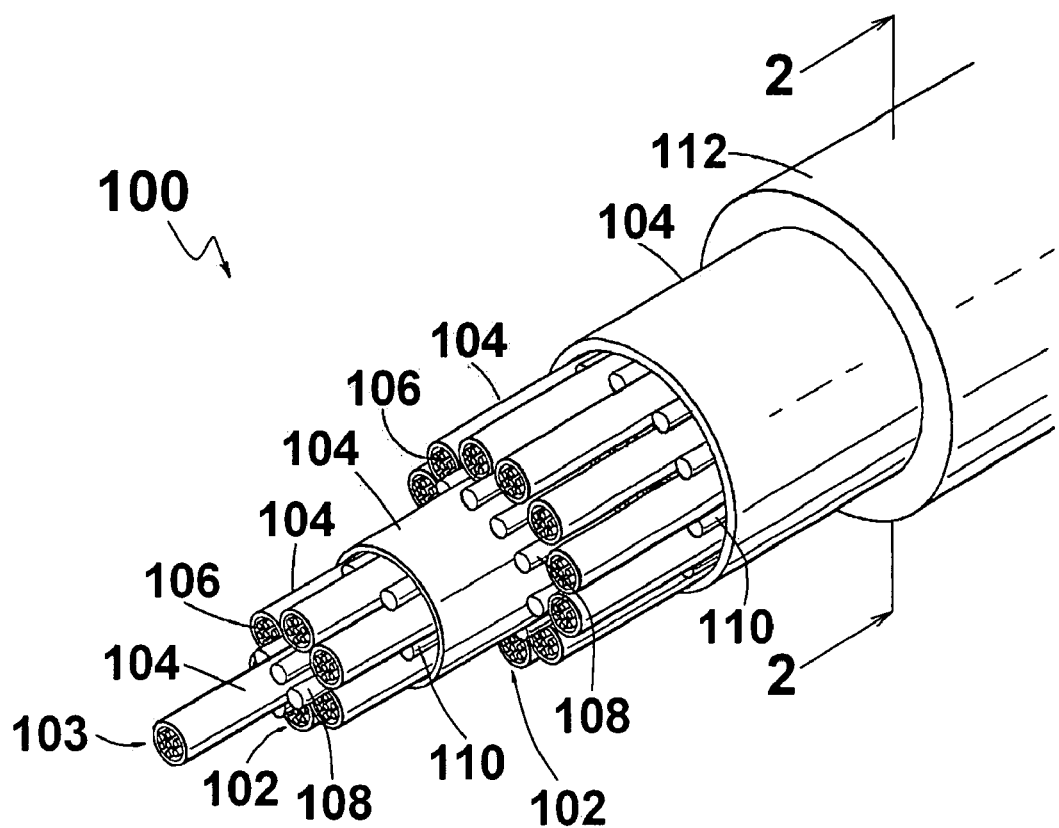
FIG. 1 is a perspective view of an electrical cable according to an embodiment of the invention.
Figure 2:
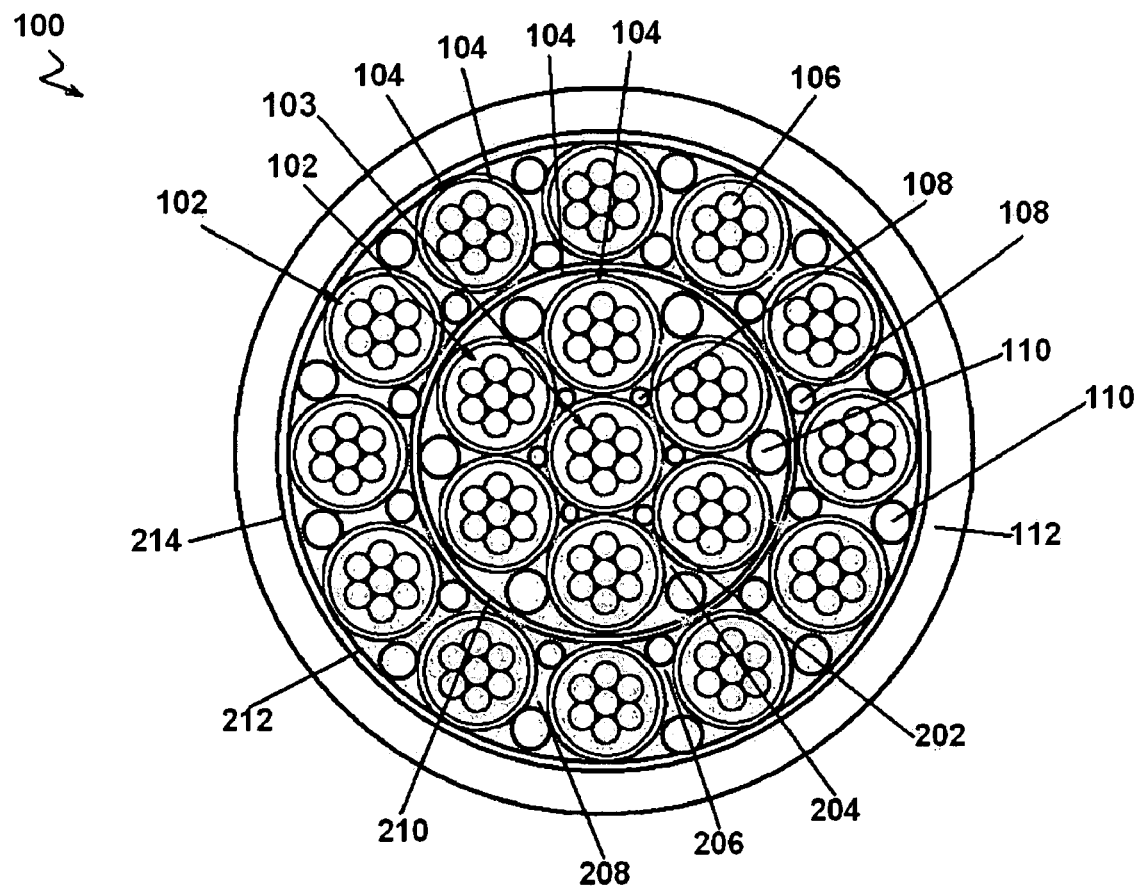
FIG. 2 is a sectional view of the electrical cable taken along line 2-2 of FIG. 1.

Referring to FIGS. 1-2, the present invention relates to an electrical cable 100 that blocks water. The electrical cable 100 blocks water primarily by the use of a water swellable tape 104 and a water swellable yarn 108. The electrical cable 100 meets or exceeds the requirements of MIL-DTL-24643, which specifies the requirements for water blocking cable used aboard Navy ships. Since the electrical cable 100 does not rely on filler material, such as silicone flooding compound, to block water, the electrical cable 100 is relatively lighter than an electrical cable that blocks water using filler material. Also, the absence of filler material simplifies manufacturing the electrical cable 100 since additional handling and processing steps are not required. Further, the electrical cable 100 can be terminated without manually peeling away or removing waterblocking material.

Referring to FIG. 1, a perspective view of the electrical cable 100 according to an embodiment of the invention is shown. The electrical cable is comprised of conductors 102, water swellable tapes 104, water swellable yarns 108, solid fillers 110, and a jacket 112.

The conductors 102 are preferably made of an electrically conductive material such as, but not limited to, copper, aluminum, silver, gold, or some other electrically conductive metal or alloy. The conductors 102 can also be plated with, but not limited to, tin, silver, nickel, or other plating material. The conductors 102 are preferably arranged longitudinally adjacent to one another to form the electrical cable 100 with a substantially circular cross section. Each of the conductors 102 may also be placed longitudinally adjacent to each other to form, for example, a substantially triangular, rectangular, trapezoidal, or polygonal cross section. Also, each of the conductors 102 may be intertwined with each other to form a helical braid or a helical spiral. The conductors 102 may be intertwined in the same direction. Alternatively, conductors 102 may be intertwined in directions different from other conductors 102. Further, the conductors 102 are preferably insulated by a dielectric material such as, but not limited to, thermoset, thermoset polyethylene, thermoplastics, thermoplastic fluoropolymers, fluorocarbon-based polymers, polyethylenes, polyvinylchlorides, polyvinylidene fluoride (PVDF), ethylene tetrafluoroethylene (ETFE), ethylene propylene rubber (EPR), silicone, silicone tape, rubber tape, glass tape, combinations of the aforementioned materials, or other electrically insulating material. In the preferred embodiment, the conductors 102 are insulated by thermoset polyethylene.

Although each of the conductors 102 may be a solid conductor, each of the conductors 102 may alternatively be made up of several conductive strands 106. Each conductive strand 106 is preferably made of an electrically conductive material such as, but not limited to, copper, aluminum, silver, gold, or some other electrically conductive metal or alloy. Also, each conductive strand 106 may be plated with, but not limited to, tin, silver, nickel, or other plating material. Each of the conductive strands 106 is preferably arranged longitudinally adjacent to each other to form a conductor 102 with a substantially circular cross section. Alternately, the conductive strands 106 may be arranged longitudinally adjacent to each other to form, for example, a substantially triangular, rectangular, trapezoidal, or polygonal cross section. The conductive strands 106 may be intertwined with each other to form a helical braid or a helical spiral. A waterblocking filler material may be applied between adjacent conductive strands 106. The waterblocking filler material can be, but is not limited to, silicone filling compound, conductive or non-conductive mastic material, or water swellable powder. Also, a dielectric material may surround each conductive strand 106 so that each conductive strand 106 is electrically insulated. The dielectric material can include, but is not limited to, thermoset, thermoset polyethylene, thermoplastics, thermoplastic fluoropolymers, fluorocarbon-based polymers, polyethylenes, polyvinylchlorides, polyvinylidene fluoride (PVDF), ethylene tetrafluoroethylene (ETFE), ethylene propylene rubber (EPR), silicone, silicone tape, rubber tape, glass tape, combinations of the aforementioned materials, or other electrically insulating material.

In the embodiment shown in FIG. 1, seven conductors 102 and 103 are each made up of seven conductive strands 106 of bare copper wire. The conductors 102 and 103 can be number 7 American Wire Gauge ("AWG") per ASTM B8 Class B. The conductors 102 and 103 can be insulated. In other embodiments, the conductors 102 and 103 may be of 12, 9, 4, or 2 AWG. Six of the insulated conductors 102 are arranged on the outer circumference of a seventh insulated conductor 103 in the center. However, the number of conductors 102 used is not meant to be limiting but meant to illustrate one particular embodiment to describe the electrical cable 100.

The water swellable tape 104 is preferably wrapped around each conductor 102 and 103. The water swellable tape 104 is made of any soft, fibrous, gauze-like material that can absorb moisture or that contains water swellable material. The water swellable tape 104 is preferably made of a super absorbent polymer tape impregnated with a powder-like water swellable material. The water swellable tape 104 can also be made of super absorbent powder laminated between non-woven material. Commercially available water swellable tape 104, such as that sold under the designation "5M102 tape" or "WSM102 tape" available from SCAPA™ may be used.

The water swellable tape 104 may be wrapped helically along a longitudinal direction of the electrical cable. It may be have a left hand or right hand lay. The water swellable tape 104 can have a butt lap, an open lap, or an overlap. A butt lap is formed when lapping disposes the water swellable tape 104 so that the edges of the tape 104 are adjacent to one another with substantially no overlapping and substantially no exposed areas between the edges. An open lap is formed when lapping of the water swellable tape 104 disposes the tape 104 with exposed areas between the edges. An overlap refers to lapping the water swellable tape 104 so that its edges overlap. Alternatively, the water swellable tape 104 may be "cigarette folded" around the conductor 102, 103. In "cigarette folding" a length of the water swellable tape 104 substantially similar to the length of the conductor 102, 103 is disposed longitudinally and wrapped around the conductor 102 and 103 so that its longitudinal edges are adjacent to each other.

As shown in FIG. 2, adjacent conductors 102 form several interstitial voids, such as 202, 204, 206, and 208. The interstitial voids are formed when two conductors 102 are placed adjacent to each other. When two conductors 102 are adjacent to each other, interstitial voids, such as 202, 204, 206, and 208, are a substantially v-shaped channel longitudinally extending with the nadir of the v at the point where the two conductors 102 lie closest to each other. Alternately, the interstitial voids may be formed when three conductors 102 are placed adjacent to each other. When three conductors 102 are positioned adjacent to each other, they form an interstitial void of substantially triangular cross section in the center of the three adjacent conductors 102. The substantially triangular interstitial void extends longitudinally along the length of the three adjacent conductors 102. In another arrangement of conductors 102, four conductors 102 are disposed adjacent to each other to form interstitial voids of substantially rectangular cross section in the center of the four adjacent conductors 102 or a pair of interstitial voids with substantially triangular cross sections. Thus, increasing the number of adjacent conductors 102 will result in interstitial voids with a polygonal cross section with an increasing number of sides or an increasing number of interstitial voids with a substantially triangular cross section.

Referring again to FIG. 2, a sectional view of the electrical cable 100 is shown. Conductors 102 form a first set of interstitial voids 202 with the center conductor 103. Each of the first set of interstitial voids 202 has a substantially triangular cross sectional shape where the center conductor 103 makes up one side and two other conductors 102 make up the other two sides of the triangular cross section. The interstitial voids 202 are formed immediately radially outward from the center conductor 102.

The six conductors 102 around the center conductor 103 also form a second set of interstitial voids 204. Each of the second set of interstitial voids 204 is a substantially v-shaped channel running the length of two adjacent conductors 102. The second set of interstitial voids 204 are formed radially outward from the first set of interstitial voids 202.

As shown in FIGS. 1-2, water swellable yarns 108 are preferably disposed longitudinally in each of the first set of interstitial voids 202. The water swellable yarns 108 may be made of water swellable material or may be impregnated with water swellable material. For example, the water swellable yarns 108 can be super absorbent polymer powder impregnated into polyester fiber. Water swellable materials or hydrophilic materials are used for water blocking. Water swellable materials, such as super absorbent polymer power, are initially dry to the touch but turn to a gel-like consistency and swell considerably when exposed to moisture. Commercially available water swellable yarns 108 from LANTOR® nl may be used.

Solid fillers 110 are disposed longitudinally in the interstitial voids. Preferably, they are disposed in a second set of interstitial voids 204. The solid fillers 110 preferably retain their shape and do not swell when they come in contact with moisture. The solid fillers 110 are preferably made of low-smoke and low-halogen polyolefin that meets the standards of MIL-DTL-24643. The solid fillers 110 may also be made of any material that retains its shape when moistened. Preferably, the solid fillers 110 are made of any material that can be extruded so that the solid fillers 110 may be extruded to a required length, which is typically a length of the electrical cable 100. The solid filler 110 can be made of, but is not limited to, thermoset, thermoset polyethylenes, thermoplastics, thermoplastic fluoropolymers, fluorocarbon-based polymers, polyethylenes, polyvinylchlorides, polyvinylidene fluoride (PVDF), ethylene tetrafluoroethylene (ETFE), ethylene propylene rubber (EPR), silicone, or combinations of the aforementioned materials. The water swellable yarns 108 and the solid fillers 110 are preferably positioned in the interstitial voids so that the electrical cable 100 has and will maintain a substantially circular cross section.

The water swellable tape 104 may also be wrapped around the surface 210 formed by the conductors 102 and solid fillers 110 placed in the second set of interstitial voids 204. The water swellable tape 104 may be substantially the same as the water swellable tape 104 described above. The water swellable tape 104 covers approximately ninety to one hundred percent (90 to 100%) of the surface 210 and preferably covers one hundred percent of the surface 210. Also, when disposed helically, the water swellable tape 104 may have no overlapping longitudinal edges or may have overlapping longitudinal edges. Preferably, the water swellable tape 104 has approximately zero to ten percent (0 to 10%) overlap when disposed helically. The slight overlap prevents potential tearing of the water swellable tape 104. The water swellable tape 104 may also have a butt lap.

The embodiment shown in FIGS. 1 and 2 also has another set of conductors 102 radially outward of the outermost surface 210. The conductors 102 are disposed longitudinally adjacent to the outermost surface 210. Each conductor 102 is preferably wrapped in the water swellable tape 104. When placed on the outer circumference, the conductors 102 form a third set of interstitial voids 206. Each of the third set of interstitial voids 206 has a substantially triangular cross sectional shape with the first water swellable tape 104 on one side and two adjacent conductors 102 on the other two sides of the substantially triangular cross section. The interstitial voids 206 are formed radially outward from the second set of interstitial voids 204. Water swellable yarns 108 are preferably disposed longitudinally in each of the third set of interstitial voids 206.

The conductors 102 also form a fourth set of interstitial voids 208. Each of the fourth set of interstitial voids 208 is a substantially v-shaped channel running the length of two adjacent conductors 102. The fourth set of interstitial voids 208 is formed radially outward from the third set of interstitial voids 206. Solid fillers 110 are preferably disposed longitudinally in each of the fourth set of interstitial voids 208.

The water swellable tape 104 substantially wraps the outermost surface 212 formed by the conductors 102 and solid fillers 110 placed in the fourth set of interstitial voids 208. The water swellable tape 104 covers approximately ninety to one hundred percent (90 to 100%) of the outermost surface 212 and preferably covers one hundred percent of the outermost surface 212. Also, when disposed helically, the water swellable tape 104 may have no overlapping longitudinal edges or may have overlapping longitudinal edges. Preferably, the water swellable tape 104 has approximately zero to ten percent (0 to 10%) overlap when disposed helically. The slight overlap prevents potential tearing of the water swellable tape 104 during the manufacturing process. The water swellable tape 104 may also have a butt lap.

The jacket 112 wraps the outermost peripheral area 214 of the electrical cable 100. The jacket 112 may be made of a non-conductive material, such as, but not limited to, a polymer or a plastic. Preferably, the jacket 112 is made of a material that emits little smoke and minor amounts of toxic fumes when the jacket 112 is combusted. Also preferably, the jacket 112 emits minimal amounts of halogens. In one embodiment, the jacket 112 is made of a material that meets the standards delineated in MIL-DTL-24643.

In the preferred embodiment of the electrical cable 100, the conductors are 7 AWG, and each is composed of seven conductive strands 106. The conductive strands 106 are made of bare copper wire. The conductive strands 106 are arranged longitudinally adjacent to each other to form insulated conductors 102 and 103 with substantially circular cross sections. The conductive strands 106 helically intertwine with each other. Filler material is applied between adjacent conductive strands 106. The filler material is applied while the conductive strands 106 are being intertwined together. Each conductor 102, 103 is insulated by thermoset polyethylene. The polyethylene is disposed on the conductors 102, 103 by extrusion and then thermoset by irradiation. Water swellable tape 104 is wrapped around each insulated conductor 102. Seven insulated conductors 102 are arranged on the outer circumference of the center insulated conductor 103. Water swellable yarns 108 are disposed longitudinally in the first set of interstitial voids 202 formed between the insulated conductors 102 and the center insulated conductor 103. Solid fillers 110 are disposed longitudinally in the second set of interstitial voids 204 formed between insulated conductors 102. The solid fillers 110 are made of low-smoke and low-halogen polyolefin and extruded to the required length of electrical cable 100. Water swellable tape 104 is wrapped around the surface 210 formed by the insulated conductors 102 and solid fillers 110 in the second set of interstitial voids 204. The water swellable tape 104 covers substantially all of the surface 210 and is disposed helically with ten percent overlap. A second set of insulated conductors 102 are disposed adjacent to the outermost surface 210. Each insulated conductor 102 of the second set is wrapped in water swellable tape 104. Water swellable yarns 108 are disposed longitudinally in the third set of interstitial voids 206 formed between the second set of insulated conductors 102 and the surface 210. Solid fillers 110 are disposed longitudinally in the fourth set of interstitial voids 208 formed between adjacent insulated conductors 102 of the second set. The solid fillers 110 are made of low-smoke and low-halogen polyolefin and extruded to the required length of electrical cable 100. Water swellable tape 104 is wrapped around the outermost surface 212 formed by the insulated conductors 102 and solid fillers 110. The water swellable tape 104 covers substantially all of outermost surface 212 and is helically disposed with ten percent overlap. The jacket 112 is extruded over the outermost peripheral area 214 and is made of material that emits little smoke, minimal amounts of halogens, and minor amounts of toxins. The preferred embodiment of the electrical cable 100, as described above, meets the standards of MIL-DTL-24643.

As is apparent from the above description, the present invention provides an electrical cable that is capable of blocking water with water swellable yarns 108 and water swellable tapes 104. Also, the electrical cable is lightweight relative to an electrical cable with filler material, and simpler to manufacture because filler material does not have to be included or handled. Further, the electrical cable 100 according to the present invention can be terminated without having to manually peel away or remove the waterblocking material. When the electrical cable 100 is cut, the water swellable tape 104, water swellable yarns 108, and solid fillers 10 are also simultaneously cut.

While a particular embodiment has been chosen to illustrate the invention, it will be understood by those skilled in the art that various changes and modifications can be made therein without departing from the scope of the invention as defined in the appended claims.

What is claimed is:

1. An electrical cable comprising:
    a plurality of conductors, each of said plurality of conductors being substantially wrapped with a water swellable tape, said plurality of conductors being disposed adjacent to each other thereby forming a plurality of interstitial voids between each of said plurality of conductors;
    a plurality of solid fillers and a plurality of water swellable yarns alternately disposed in each of said plurality of interstitial voids;
    additional water swellable tape substantially enveloping said plurality of conductors, said plurality of water swellable yarns, and said plurality of solid fillers; and
    a jacket disposed on an outermost surface of said electrical cable,
    wherein said plurality of solid fillers are disposed in a set of inner radial interstitial voids and said plurality of water swellable yarns are disposed in a set of outer radial interstitial voids.

2. The electrical cable according to claim 1, wherein said each of said plurality of conductors is composed of a plurality of conductive strands.

3. The electrical cable according to claim 2, further comprising a waterblocking filler material on each of said plurality of conductive strands.

4. The electrical cable according to claim 1, further comprising a dielectric material substantially surrounding each of said plurality of conductors.

5. The electrical cable according to claim 1, wherein said plurality of water swellable yarns and said plurality of solid fillers are disposed in said plurality of interstitial voids to provide said electrical cable with a substantially circular cross-sectional shape.

6. The electrical cable according to claim 1, wherein said additional water swellable tape is disposed helically along a longitudinal direction of said electrical cable.

7. The electrical cable according to claim 1, wherein said additional water swellable tape has an overlap of approximately 0% to approximately 10%.

8. An electrical cable comprising:
    a first plurality of conductors, each of said first plurality of conductors being substantially wrapped with a first water swellable tape, said first plurality of conductors being disposed adjacent to each other thereby forming a first plurality of interstitial voids between each of said first plurality of conductors;
    a second plurality of conductors surrounding said first plurality of conductors, each of said second plurality of conductors being substantially wrapped with a second water swellable tape, said second plurality of conductors being disposed adjacent to each other thereby forming a second plurality of interstitial voids between each of said second plurality of conductors;

a plurality of solid fillers and a plurality of water swellable yarns alternately disposed in each of said first and second pluralities of interstitial voids;

additional water swellable tape substantially enveloping said second plurality of conductors, said plurality of water swellable yarns, and said plurality of solid fillers; and a jacket disposed on an outermost surface of said electrical cable, wherein said plurality of solid fillers are disposed in a set of inner radial interstitial voids and said plurality of water swellable yarns are disposed in a set of outer radial interstitial voids.

9. The electrical cable according to claim 8, wherein each of said first plurality of conductors and each of said second plurality of conductors are composed of a plurality of conductive strands.

10. The electrical cable according to claim 9, further comprising a waterblocking filler material on each of said plurality of conductive strands.

11. The electrical cable according to claim 8, further comprising a dielectric material substantially surrounding each of said first plurality of conductors and each of said second plurality of conductors.

12. The electrical cable according to claim 8, wherein said plurality of water swellable yarns and said plurality of solid fillers are disposed in said first and second pluralities of interstitial voids to provide said electrical cable with a substantially circular cross-sectional shape.

13. The electrical cable according to claim 8, further comprising another water swellable tape substantially enveloping said first plurality of conductors, said plurality of water swellable yarns, and said plurality of solid fillers disposed in said first plurality of interstitial voids.

14. The electrical cable according to claim 8, wherein said additional water swellable tape is disposed helically along a longitudinal direction of said electrical cable.

15. The electrical cable according to claim 8, wherein said additional water swellable tape has an overlap of approximately 0% to approximately 10%.

16. An electrical cable comprising:

a center conductor, said center conductor having a plurality of conductive strands, said center conductor being substantially wrapped by a first water swellable tape;

a first plurality of conductors, each of said first plurality of conductors having a plurality of conductive strands, said first plurality of conductors being disposed adjacent to each other and said center conductor;

a first multitude of water swellable tape, each of first multitude of water swellable tape substantially wrapping a conductor of the first plurality of conductors;

a first set of interstitial voids formed between said center conductor and said first plurality of conductors;

a first plurality of water swellable yarns longitudinally disposed in each of said first set of interstitial voids;

a second set of interstitial voids formed between each of said first plurality of conductors, said second set of interstitial voids disposed radially outward from said first set of interstitial voids;

a first plurality of solid fillers longitudinally disposed in each of said second set of interstitial voids;

a second water swellable tape substantially wrapping an outermost surface formed by said first plurality of conductors and said first plurality of solid fillers;

a second plurality of conductors, each of said second plurality of conductors having a plurality of conductive strands, said second plurality of conductors disposed adjacent to each other and said second water swellable tape;

a second multitude of water swellable tape, each of second multitude of water swellable tape substantially wrapping a conductor of the second plurality of conductors;

a third set of interstitial voids formed between said second water swellable tape and said second plurality of conductors;

a second plurality of water swellable yarns longitudinally disposed in each of said third set of interstitial voids;

a fourth set of interstitial voids formed between each of said second plurality of conductors, said fourth set of interstitial voids disposed radially outward of said third set of interstitial voids;

a second plurality of solid fillers longitudinally disposed in each of said fourth set of interstitial voids;

a third water swellable tape substantially surrounding an outermost area formed by said second plurality of conductors and second plurality of solid fillers; and a jacket disposed on an outermost peripheral area of said electrical cable.

17. The electrical cable according to claim 16, further comprising a waterblocking filler material applied on each of said plurality of conductive strands.

18. The electrical cable according to claim 16, further comprising a dielectric material substantially surrounding each of said plurality of conductors.

19. The electrical cable according to claim 18, wherein said first water swellable tape is disposed helically along a longitudinal direction of said electrical cable.

20. The electrical cable according to claim 19, wherein said first water swellable tape has an overlap of approximately 0% to approximately 10%.

21. The electrical cable according to claim 16, wherein said second water swellable tape is disposed helically along a longitudinal direction of said electrical cable.

22. The electrical cable according to claim 21, wherein said second water swellable tape has an overlap of approximately 0% to approximately 10%.

23. The electrical cable according to claim 16, wherein said first plurality of water swellable yarns, said first plurality of solid fillers, said second plurality of water swellable yarns, and second plurality of solid fillers are disposed to provide said electrical cable with a substantially circular cross-sectional shape.

24. An electrical cable comprising:

a center conductor, said center conductor being substantially wrapped by a first water swellable tape;

a plurality of conductors surrounding said center conductor, each of said plurality of conductors being substantially wrapped with a second water swellable tape, said plurality of conductors being disposed adjacent to each other thereby forming a plurality of interstitial voids between each of said plurality of conductors;

a plurality of solid fillers and a plurality of water swellable yarns alternately disposed in each of said plurality of interstitial voids;

a third water swellable tape substantially enveloping said plurality of conductors, said plurality of water swellable yarns, and said plurality of solid fillers; and a jacket disposed on an outermost surface of said electrical cable, wherein said plurality of solid fillers are disposed in a set of inner radial interstitial voids and said plurality of water swellable yarns are disposed in a set of outer radial interstitial voids.

25. The electrical cable according to claim 24, wherein said center conductor and each of said plurality of conductors are composed of a plurality of conductive strands.

26. The electrical cable according to claim 25, further comprising a waterblocking filler material on each of said plurality of conductive strands.

27. The electrical cable according to claim 24, further comprising a dielectric material substantially surrounding said center conductor and each of said plurality of conductors.

28. The electrical cable according to claim 24, wherein said plurality of water swellable yarns and said plurality of solid fillers are disposed in said plurality of interstitial voids to provide said electrical cable with a substantially circular cross-sectional shape.

29. The electrical cable according to claim 24, wherein said additional water swellable tape is disposed helically along a longitudinal direction of said electrical cable.

30. The electrical cable according to claim 24, wherein said additional water swellable tape has an overlap less than or equal to approximately 10%.

31. An electrical cable comprising:
   a plurality of conductors, each of said plurality of conductors being substantially wrapped with a water swellable tape, said plurality of conductors being disposed adjacent to each other thereby forming a plurality of interstitial voids between each of said plurality of conductors;
   a plurality of solid fillers and a plurality of water swellable yarns alternately disposed in each of said plurality of interstitial voids;
   additional water swellable tape substantially enveloping said plurality of conductors, said plurality of water swellable yarns and said plurality of solid fillers; and
   a jacket disposed on an outermost surface of said electrical cable,
   wherein said plurality of water swellable yarns are disposed in a set of inner radial interstitial voids and said plurality of solid fillers are disposed in a set of outer radial interstitial voids.

32. The electrical cable according to claim 31, wherein said each of said plurality of conductors is composed of a plurality of conductive strands.

33. The electrical cable according to claim 32, further comprising a waterblocking filler material on each of said plurality of conductive strands.

34. The electrical cable according to claim 31, further comprising a dielectric material substantially surrounding each of said plurality of conductors.

35. The electrical cable according to claim 31, wherein said additional water swellable tape is disposed helically along a longitudinal direction of said electrical cable.

36. The electrical cable according to claim 31, wherein said additional water swellable tape has an overlap of approximately 0% to approximately 10%.

37. An electrical cable comprising:
   a first plurality of conductors, each of said first plurality of conductors being substantially wrapped with a first water swellable tape, said first plurality of conductors being disposed adjacent to each other thereby forming a first plurality of interstitial voids between each of said first plurality of conductors;
   a second plurality of conductors surrounding said first plurality of conductors, each of said second plurality of conductors being substantially wrapped with a second water swellable tape, said second plurality of conductors being disposed adjacent to each other thereby forming a second plurality of interstitial voids between each of said second plurality of conductors;
   a plurality of solid fillers and a plurality of water swellable yarns alternately disposed in each of said first and second pluralities of interstitial voids;
   additional water swellable tape substantially enveloping said second plurality of conductors, said plurality of water swellable yarns and said plurality of solid fillers; and
   a jacket disposed on an outermost surface of said electrical cable,
   wherein said plurality of water swellable yarns are disposed in a set of inner radial interstitial voids and said plurality of solid fillers are disposed in a set of outer radial interstitial voids.

38. The electrical cable according to claim 37, wherein said each of said plurality of conductors is composed of a plurality of conductive strands.

39. The electrical cable according to claim 38, further comprising a waterblocking filler material on each of said plurality of conductive strands.

40. The electrical cable according to claim 37, further comprising a dielectric material substantially surrounding each of said plurality of conductors.

41. The electrical cable according to claim 37, wherein said additional water swellable tape is disposed helically along a longitudinal direction of said electrical cable.

42. The electrical cable according to claim 37, wherein said additional water swellable tape has an overlap of approximately 0% to approximately 10%.

43. An electrical cable comprising:
   a center conductor, said center conductor being substantially wrapped by a first water swellable tape;
   a plurality of conductors surrounding said center conductor, each of said plurality of conductors being substantially wrapped with a second water swellable tape, said plurality of conductors being disposed adjacent to each other thereby forming a plurality of interstitial voids between each of said plurality of conductors;
   a plurality of solid fillers and a plurality of water swellable yarns alternately disposed in each of said plurality of interstitial voids;
   a third water swellable tape substantially enveloping said plurality of conductors, said plurality of water swellable yarns, and said plurality of solid fillers; and
   a jacket disposed on an outermost surface of said electrical cable,
   wherein said plurality of water swellable yarns are disposed in a set of inner radial interstitial voids and said plurality of solid fillers are disposed in a set of outer radial interstitial voids.

44. The electrical cable according to claim 43, wherein said each of said plurality of conductors is composed of a plurality of conductive strands.

45. The electrical cable according to claim 44, further comprising a waterblocking filler material on each of said plurality of conductive strands.

46. The electrical cable according to claim 43, further comprising a dielectric material substantially surrounding each of said plurality of conductors.

47. The electrical cable according to claim 43, wherein said additional water swellable tape is disposed helically along a longitudinal direction of said electrical cable.

48. The electrical cable according to claim 43, wherein said additional water swellable tape has an overlap of approximately 0% to approximately 10%.

* * * * *